United States Patent
Ghosh et al.

(10) Patent No.: US 10,419,972 B2
(45) Date of Patent: Sep. 17, 2019

(54) APPARATUS, SYSTEM AND METHOD OF COMMUNICATING A WIRELESS COMMUNICATION FRAME WITH A HEADER

(71) Applicant: INTEL IP CORPORATION, Santa Clara, CA (US)

(72) Inventors: Chittabrata Ghosh, Fremont, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/489,471

(22) Filed: Apr. 17, 2017

(65) Prior Publication Data

US 2017/0223571 A1    Aug. 3, 2017

Related U.S. Application Data

(63) Continuation of application No. 14/748,572, filed on Jun. 24, 2015, now Pat. No. 9,655,112.

(Continued)

(51) Int. Cl.
*H04W 28/06* (2009.01)
*H04W 72/04* (2009.01)
(Continued)

(52) U.S. Cl.
CPC ........ *H04W 28/065* (2013.01); *H04B 7/0452* (2013.01); *H04L 1/1614* (2013.01);
(Continued)

(58) Field of Classification Search
CPC ... H04B 7/0452; H04B 7/0697; H04L 1/1614; H04L 5/0046; H04L 69/22;
(Continued)

(56) References Cited

U.S. PATENT DOCUMENTS 8,023,481 B2  9/2011  Kwon
8,107,493 B2  1/2012  Kwon et al.
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Ahmed Elallam
(74) *Attorney, Agent, or Firm* — Shichrur & Co.

(57) ABSTRACT

Some demonstrative embodiments include apparatuses, devices, systems and methods of communicating a wireless communication frame. For example, a wireless station may generate a frame including a header portion, the header portion including a legacy header, followed by a first non-legacy header, the header portion including a first indication to indicate whether or not the header portion is to include a second non-legacy header following the first non-legacy header, the header portion including a second indication to indicate whether or not channel bonding is to be used; and process transmission of the frame to at least one second wireless station over a directional wireless communication band.

55 Claims, 6 Drawing Sheets

Related U.S. Application Data

(60) Provisional application No. 62/154,910, filed on Apr. 30, 2015.

(51) Int. Cl.
  H04L 29/06 (2006.01)
  H04L 5/00 (2006.01)
  H04B 7/0452 (2017.01)
  H04L 1/16 (2006.01)
  H04L 27/26 (2006.01)

(52) U.S. Cl.
  CPC ............ H04L 5/001 (2013.01); H04L 5/0023 (2013.01); H04L 5/0046 (2013.01); H04L 5/0094 (2013.01); H04L 27/26 (2013.01); H04L 69/22 (2013.01); H04W 72/0406 (2013.01); H04W 72/0446 (2013.01); H04W 72/0453 (2013.01); H04L 27/2602 (2013.01); H04L 27/2636 (2013.01)

(58) Field of Classification Search
  CPC . H04L 27/2608; H04L 5/0028; H04L 5/0092; H04L 5/0094; H04L 27/26; H04L 27/2602; H04L 27/2636; H04L 5/001; H04L 5/0023; H04W 28/065; H04W 72/0453; H04W 72/0406; H04W 72/0446
  See application file for complete search history.

(56) References Cited

U.S. PATENT DOCUMENTS

| | | | |
|---|---|---|---|
| 8,121,101 B2 | 2/2012 | Kalogridis et al. | |
| 9,002,015 B2 | 4/2015 | Fong et al. | |
| 9,438,405 B2 | 9/2016 | Seok | |
| 9,596,060 B1* | 3/2017 | Sun | H04L 5/0025 |
| 9,655,112 B2 | 5/2017 | Ghosh et al. | |
| 9,826,435 B2* | 11/2017 | Kasher | H04W 28/26 |
| 9,872,243 B2* | 1/2018 | Li | H04W 48/20 |
| 9,906,282 B2* | 2/2018 | Cordeiro | H04B 7/0452 |
| 2007/0076752 A1 | 4/2007 | Zeira et al. | |
| 2007/0160040 A1 | 7/2007 | Kwon | |
| 2010/0329366 A1 | 12/2010 | Wang et al. | |
| 2012/0082122 A1 | 4/2012 | Trainin | |
| 2013/0044742 A1 | 2/2013 | Zhang et al. | |
| 2013/0136001 A1* | 5/2013 | Mese | H04W 4/18 370/235 |
| 2013/0208715 A1 | 8/2013 | Roh et al. | |
| 2014/0029547 A1 | 1/2014 | Seok | |
| 2014/0064261 A1 | 3/2014 | Wang et al. | |
| 2014/0086228 A1 | 3/2014 | Kwon | |
| 2015/0146653 A1 | 5/2015 | Zhang et al. | |
| 2015/0349857 A1 | 12/2015 | Cordeiro et al. | |
| 2016/0088628 A1 | 3/2016 | Zhang et al. | |
| 2016/0249332 A1 | 8/2016 | Xin et al. | |
| 2016/0323058 A1 | 11/2016 | Cordeiro et al. | |
| 2017/0127440 A1* | 5/2017 | Chun | H04W 72/1284 |
| 2017/0164241 A1* | 6/2017 | Kasher | H04L 5/00 |
| 2017/0231009 A1* | 8/2017 | Wang | H04W 74/0816 |
| 2017/0280354 A1* | 9/2017 | Huang | H04W 28/065 |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

International Search Report and Written Opinion for PCT/US2016/023679, dated Jul. 21, 2016, 11 pages.

Notice of Allowance for U.S. Appl. No. 14/748,572, dated Jan. 13, 2017, 13 pages.

International Preliminary Report on Patentability for PCT/US2016/023679, dated Nov. 9, 2017, 7 pages.

European Search Report for European Patent Application No. 16786883.5, dated Nov. 26, 2018, 7 pages.

Jiamin Chen et al.; "TGaj Complete Proposal Specification (60GHz)"; IEEE 802.11-13/1302r1, Jan. 2014, 94 pages.

* cited by examiner

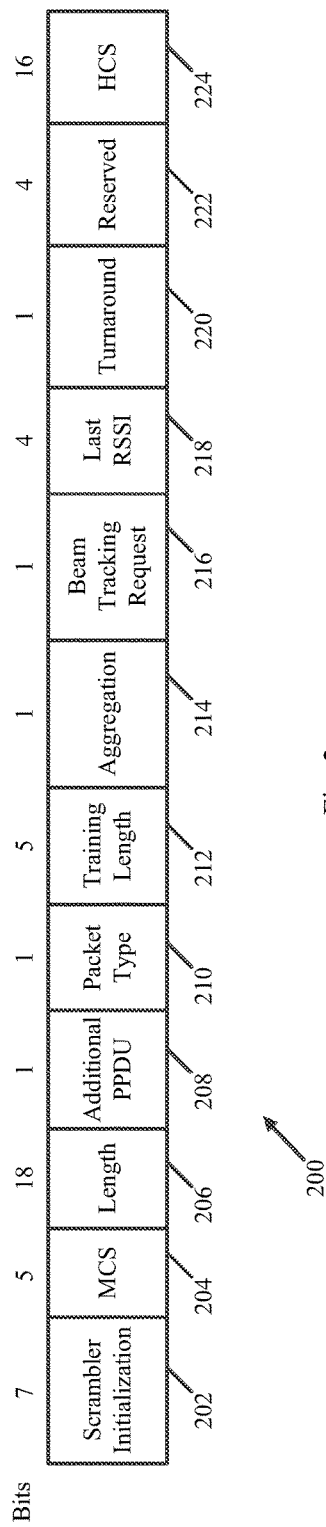
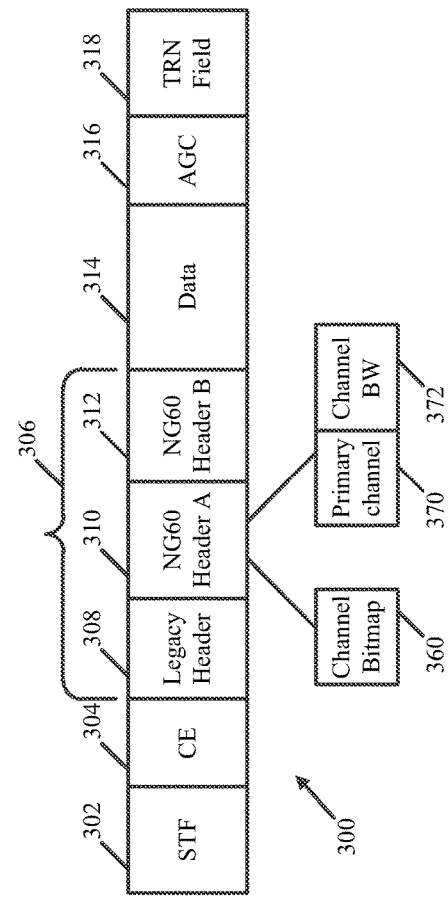
Fig. 2
Fig. 3

APPARATUS, SYSTEM AND METHOD OF COMMUNICATING A WIRELESS COMMUNICATION FRAME WITH A HEADER

CROSS REFERENCE

This application claims the benefit of and priority from U.S. Provisional Patent Application No. 62/154,910 entitled "Apparatus, System and Method of Wireless Communication using a Physical Layer Header", filed Apr. 30, 2015, the entire disclosure of which is incorporated herein by reference.

TECHNICAL FIELD

Embodiments described herein generally relate to communicating a wireless communication frame with a header.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

Some Specifications may be configured to support a Single User (SU) system, in which a Station (STA) cannot transmit frames to more than a single STA at a time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of a Single Carrier (SC) Physical Layer (PHY) header.

FIG. 3 is a schematic illustration of a frame structure, in accordance with some demonstrative embodiments.

DETAILED DESCRIPTION

Figure 1:
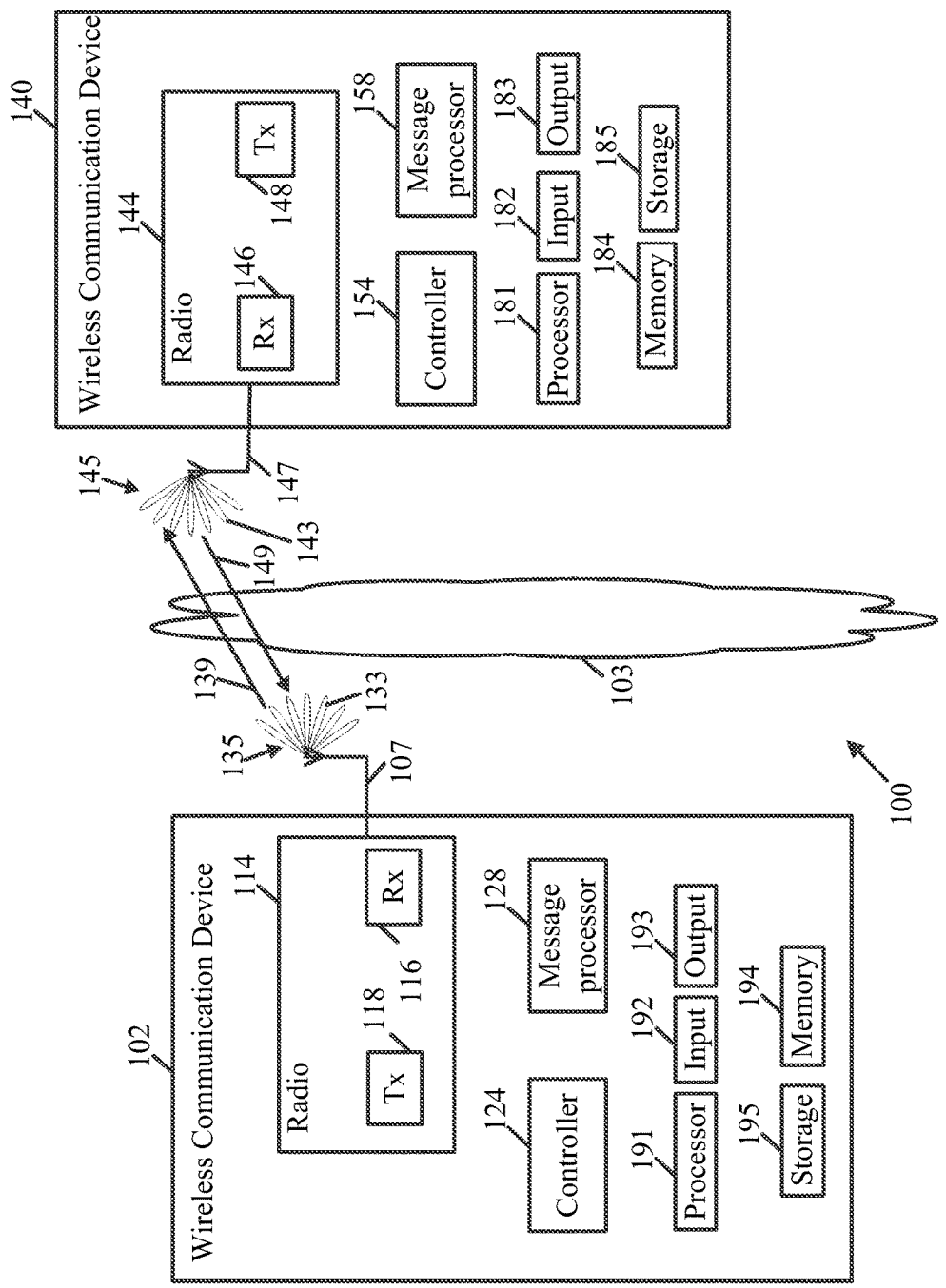
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification* Version 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11ac-2013 ("*IEEE P*802.11ac-2013, *IEEE Standard for Information Technology—Telecommunications and Information Exchange*

Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmcm/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, a second wireless communication device 140, and/or one or more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components.

In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations, e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, e.g., via a direction 133, and/or device 140 may transmit a directional transmission 149 to device 102, e.g., via a direction 143.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some communications over a wireless communication band, for example, a DMG band or any other band, may be performed over a single channel bandwidth (BW). For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the Channel bonding may include, for example, a mechanism and/or an operation whereby two or more channels can be combined, e.g., for a higher bandwidth of packet transmission, for example, to enable achieving higher data rates, e.g., when compared to transmissions over a single channel.

In some demonstrative embodiments, devices 102 and/or 140 may be configured to implement one or more channel bonding mechanisms, which may for example, support an increased channel bandwidth, for example, a channel BW of 4.32 GHz, a channel BW of 6.48 GHz, and/or any other additional or alternative channel BW.

Some specifications, e.g., an *IEEE* 802.11*ad Specification*, may be configured to support a Single User (SU) system, in which a Station (STA) cannot transmit frames to more than a single STA at a time. Such Specifications may not be able, for example, to support transmission from a STA to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication.

In one example, devices 102 and/or 140 may be configured to implement one or more MU mechanisms, which may be configured to enable, for example, MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to implement any other additional or alternative MU mechanism, e.g., to communicated MU transmissions, and/or any other MIMO mechanism, e.g., to communicate MIMO transmissions.

In some demonstrative embodiments, a communication scheme may be configured to include changes to an existing standard, for example, a legacy standard, e.g., the *IEEE* 802.11*ad standard*, for example, in a Physical layer (PHY) and/or a Media Access Control (MAC) layer, e.g., to support channel bonding and/or MU capabilities, e.g., as described below.

In other embodiments, a new and/or independent communication scheme may include a PHY layer and/or MAC layer and/or any other layer, which may be configured to support channel bonding and/or MU capabilities, e.g., as described below.

In some demonstrative embodiments, a configuration of a Physical Layer (PHY) header in accordance with the *IEEE* 802.11*ad Specifications* may not be suitable, for example, at least to support MU capabilities and/or channel bonding capabilities.

FIG. 2 is a schematic illustration of a Single Carrier (SC) Physical Layer (PHY) header 200. For example, the SC PHY header of FIG. 2 may be communicated in accordance with the *IEEE* 802.11*ad-2012 Specification*.

In some demonstrative embodiments, header 200 may include a scrambler initialization field 202, an MCS field 204, a length field 206, an Additional PPDU field 208, a packet type field 210, a training length field 212, an aggregation field 214, a beam tracking request field 216, a last Received Signal Strength Indication (RSSI) field 218, a turnaround field 220, a reserved field 222, and/or a Header Check Sequence (HCS) field 224. In other embodiments, header 200 may include any other additional or alternative fields.

In some demonstrative embodiments, the PHY header according to the *IEEE* 802.11*ad-2012 Specification* may not be capable, for example, of at least indicating to multiple STAs to which STA a Physical Layer Convergence Protocol (PLCP) Protocol Data Unit (PPDU) is to be addressed, e.g., as part of a MU transmission.

In some demonstrative embodiments, spatial streams of a transmission, for example a MU MIMO transmission, may be assigned to different STAs, for example, in opposed to the SU transmission supported by the *IEEE* 802.11*ad-2012 Specification*.

Accordingly, in some demonstrative embodiments, additional signaling may be configured, for example, to support transmission of spatial streams to different STAs, e.g., as described below.

In some demonstrative embodiments, devices 102 and/or 140 may be configured to use a header, for example, a PHY header, which may be configured to provide header signaling, e.g., PHY header signaling, for example, modified, new, and/or enhanced header signaling, which may be configured to accommodate frame transmission to multiple stations, for example, using DL MU MIMO, e.g., as described below.

In some demonstrative embodiments, the configuration of a header, for example, a PHY header, may be enhanced, changed, updated, reconfigured, and/or amended, for example, to support MU capabilities and/or channel bonding capabilities.

In other embodiments, a header, e.g., a PHY header, of any other Specification may be enhanced, changed, and/or amended, and/or a new header structure, e.g., a new PHY header structure, may be defined, e.g., as described below.

In some demonstrative embodiments, devices 102 and/or 140 may be configured to communicate over a Next Generation 60 GHz (NG60) network, an Extended DMG (EDMG) network, and/or any other network over any other frequency band.

For example, devices 102 and/or 140 may be configured to communicate DL MU-MIMO transmissions and/or use channel bonding, for example, for communicating over the NG60 and/or EDMG networks.

In some demonstrative embodiments, devices 102 and/or 140 may be configured to process transmission and/or reception of transmissions including at least two headers (also referred to as "signal fields"), for example, two new headers.

In some demonstrative embodiments, devices 102 and/or 140 may be configured to process transmission and/or reception of transmissions including at least one header, for example, at least one new header, e.g., in addition to an existing or legacy header.

In some demonstrative embodiments, the at least two new headers may be configured, for example, to support MU-MIMO signaling, corresponding training sequences, and/or any other functionality and/or communications, e.g., as described below.

In some demonstrative embodiments, devices 102 and/or 140 may be configured to process signaling and/or indications in a header, for example, a PHY header, e.g., to indicate the presence and format of the at least two headers.

In some demonstrative embodiments, a header of a frame, e.g., a PHY header or any other header, may be configured according to a signaling scheme, for example, to indicate whether one or more additional headers are to be included within a PPDU, for example, to indicate MU-MIMO operation and/or channel bonding, e.g., as described below.

In some demonstrative embodiments, controller 124 may be configured to cause a wireless station, for example, a wireless station implemented by device 102, to generate a frame including a header portion and a data portion, e.g., as described below. For example, controller 124 may cause message processor 128 and/or radio 114 to generate and/or transmit the frame.

In some demonstrative embodiments, controller 154 may be configured to cause a wireless station, for example, a wireless station implemented by device 140, to process a received frame including a header portion and a data portion, e.g., as described below. For example, controller 154 may cause message processor 158 and/or radio 114 to process reception of the frame.

In some demonstrative embodiments, the header portion may include, for example, a PHY header, e.g., as described below.

In some demonstrative embodiments, the header portion may be configured, for example, to indicate whether or nor one or more headers are to be included within the header portion, for example, one or more headers to indicate a MU transmission, e.g., MU-MIMO operation, and/or channel bonding, e.g., as described below.

In some demonstrative embodiments, the header portion, for example, a PHY header, may be configured to use a channel bitmap, which may be configured, for example, to indicate a plurality of channels, for example, a set of channels, e.g., contiguous and/or non-contiguous channels, which may be bonded, for example, to communicate a PPDU ("the current PPDU") including the header portion, e.g., as described below.

In some demonstrative embodiments, the header portion, for example, a PHY header, may be configured to include a channel number corresponding to a primary channel that a Basic Service Set (BSS) may be currently operating on. This configuration may enable, for example, to provide an implicit indication in the current PPDU of the number of contiguous channels that are to be bonded, e.g., as described below.

Reference is made to FIG. 3, which schematically illustrates a frame structure 300, in accordance with some demonstrative embodiments.

In some demonstrative embodiments, device 102 (FIG. 1) and/or device 140 (FIG. 1) may be configured to process transmission and/or reception of the frame structure 300 of FIG. 3. For example, device 102 (FIG. 1) may be configured to generate and transmit a frame having the frame structure of FIG. 3, and/or device 140 (FIG. 1) may be configured to process reception of a frame having the frame structure of FIG. 3, e.g., as described below.

In some demonstrative embodiments, as shown in FIG. 3, frame structure 300 may include a Short Training Field (STF) 302, a channel estimation (CE) field 304, a header portion 306, a data portion 314, an Automatic Gain Control (AGC) field 316, and/or a Training (TRN) field 318.

In some demonstrative embodiments, header portion 306 may include a PHY header portion.

In some demonstrative embodiments, header portion 306 may include a PLCP header portion, e.g., of a PPDU including the fields of frame structure 300.

In some demonstrative embodiments, a header structure of header portion 306 may be configured to support NG60 and/or EDMG communication, and/or any other type and/or formal of communication, e.g., as described below.

In some demonstrative embodiments, as shown in FIG. 3, header portion 306 may include legacy header 308.

In some demonstrative embodiments, legacy header 308 may include a header, which may have a structure in accordance with a current, legacy and/or conventional header.

In some demonstrative embodiments, legacy header 308 may have a structure, which may be processed, decoded and/or demodulated by one or more legacy, existing and/or conventional, e.g., devices which may currently be in the market.

In some demonstrative embodiments, legacy header 308 may have a structure, which may be in accordance with a PHY header structure according to an *IEEE* 802.11 *Specification*, for example, an *IEEE* 802.11*ad Specification*, and/or any other Specification, protocol or Standard.

In some demonstrative embodiments, legacy header 308 may include a Single Carrier (SC) header. In other embodiments, legacy header 308 may include an OFDM header, and/or any other header.

In some demonstrative embodiments, header portion 306 may be configured to include one or more new information headers, which may be included as part of a PLCP header of a PPDU, e.g., as described below In some demonstrative embodiments, header portion 306 may include a first non-legacy header 310, denoted "NG60 Header A" or "EDMG Header A", e.g., as described below.

In some demonstrative embodiments, header portion 306 may include a second non-legacy header 312, denoted "NG60 Header B" or "EDMG Header B".

In some demonstrative embodiments, header portion 306 may optionally include one or more additional non-legacy headers (not shown in FIG. 3). In one example, the additional non-legacy headers may include additional information, e.g., in addition to the information described below with respect to headers 310 and/or 312. In another example, at least part of the information described below with respect to headers 310 and/or 312 may be included in, e.g., distributed between, more than two headers, e.g., headers 310, 312 and one or more additional headers.

In some demonstrative embodiments, non-legacy headers 310 and/or 312 may be configured, for example, to allow, at least a modular design, e.g., if not all features are to be supported by all devices.

In some demonstrative embodiments, non-legacy headers 310 and/or 312 may be configured, for example, to enable, at least fit each of the first and/or second non-legacy headers in a single PHY symbol/block size, which may be limited, for example, to a size of about 48 bits, e.g., if SC is used, or any other size.

In other embodiments, two or more non-legacy headers, e.g., non-legacy headers 310 and 312, may be combined into a single header and/or may be divided into more than two headers.

In some demonstrative embodiments, non-legacy header 310 may include, for example, information of a number of channels to be bonded, e.g., to transmit at least data portion 314; modulation and coding information for example, an indication of a modulation and coding scheme (MCS), e.g., to be applied at least to data portion 314; a length of the PPDU, e.g., a length of at least data portion 314 and/or one or more elements of frame 300, a Cyclic Prefix (CP) interval; a number of spatial streams, e.g., to transmit at least data portion 314 to one or more users; and/or any other additional or alternative information.

In some demonstrative embodiments, non-legacy header 312 may include, for example, MU-MIMO parameters, e.g., only MU-MIMO parameters, for example, information relating to Spatial Streams (SS), beamforming variables, training sequences, e.g., to be applied to at least data portion 314, and/or any other additional or alternative information.

In some demonstrative embodiments, at least some of the information of non-legacy header 312 may be included in non-legacy header 310, for example, in addition to or instead of including the information in non-legacy header 312.

In one example, the non-legacy header 310 may include information of the number of spatial streams, e.g., to transmit at least data portion 314 to one or more users.

In some demonstrative embodiments, a non-legacy header may be mandatory or optional, e.g., as described below.

In some demonstrative embodiments, at least one non-legacy header, e.g., non-legacy header 310, may be configured to always be present, for example, in one or more types of frames or transmissions, for example, in all NG60 PPDUs and/or any other frames or transmissions.

In some demonstrative embodiments, at least one non-legacy header, e.g., non-legacy header 312, may be configured to be optionally present, for example, in one or more types of frames or transmissions, for example, in some or all NG60 PPDUs and/or any other frames or transmissions. For example, at least one non-legacy header, e.g., non-legacy header 312, may be present in one or more PPDUS, and absent from one or more other PPDUs.

In some demonstrative embodiments, header portion 306 may be configured to provide an indication on whether or not at least one non-legacy header, e.g., non-legacy header 312, is to be included in a frame, e.g., a PPDU including header portion 306, as described below.

In some demonstrative embodiments, the presence of absence of a non-legacy header, e.g., non-legacy header 312, in a PPDU may be indicated, for example, by an indication, for example, in a field, e.g., a 1-bit field or any other field or indication, which may be, for example, included in the PPDU.

In some demonstrative embodiments, the indication of the presence or absence of the at least one non-legacy header may be included as part of legacy header 308, e.g., as described below.

In some demonstrative embodiments, the indication of the presence or absence of the at least one non-legacy header, e.g., non-legacy header 312, may be included as part of another non-legacy header, for example, a mandatory non-legacy header or an optional non-legacy header. In one example, the indication of the presence or absence of the at least one non-legacy header, e.g., non-legacy header 312, may be included as part of non-legacy header 310, e.g., as described below.

In other embodiments, the indication of the presence or absence of the at least one non-legacy header, e.g., non-legacy header 312, may be included as part of any other element of the frame structure 300.

In some demonstrative embodiments, header portion 306 may include a first indication to indicate whether or not header portion 306 is to include non-legacy header 312, e.g., following non-legacy header 310; and/or a second indication to indicate whether or not channel bonding is to be used, for example, to communicate at least data portion 314, AGC field 316 and/or TRN field 318, e.g., as described below.

In some demonstrative embodiments, legacy header 308 may include the first indication and/or the second indication, e.g., as described below.

In some demonstrative embodiments, legacy header 308 may include both the first indication and the second indication, e.g., as described below.

In some demonstrative embodiments, according to a first scheme ("Option 1"), an indication and/or signaling of the presence of non-legacy header 312, and/or an indication of channel bonding, may be included in legacy header 308, e.g., as described below.

In some demonstrative embodiments, one or more bits of the legacy header 308, for example, 2 bits in the legacy header 308, e.g., 2 Reserved bits in the legacy header 308, or any other number of bits of legacy header 308, may be re-used, for example, to provide the first indication and/or the second indication.

In some demonstrative embodiments, a bit of legacy header 308, for example, a reserved bit of legacy header 308, may be configured to indicate presence of non-legacy header 312, e.g., as described below.

In some demonstrative embodiments, a bit of legacy header 308, for example, a reserved bit of legacy header 308, may be configured to indicate whether or not channel bonding is to be applied, for example, to communicate data portion 314, AGC field 316 and/or TRN field 318, e.g., as described below.

Figure 4:
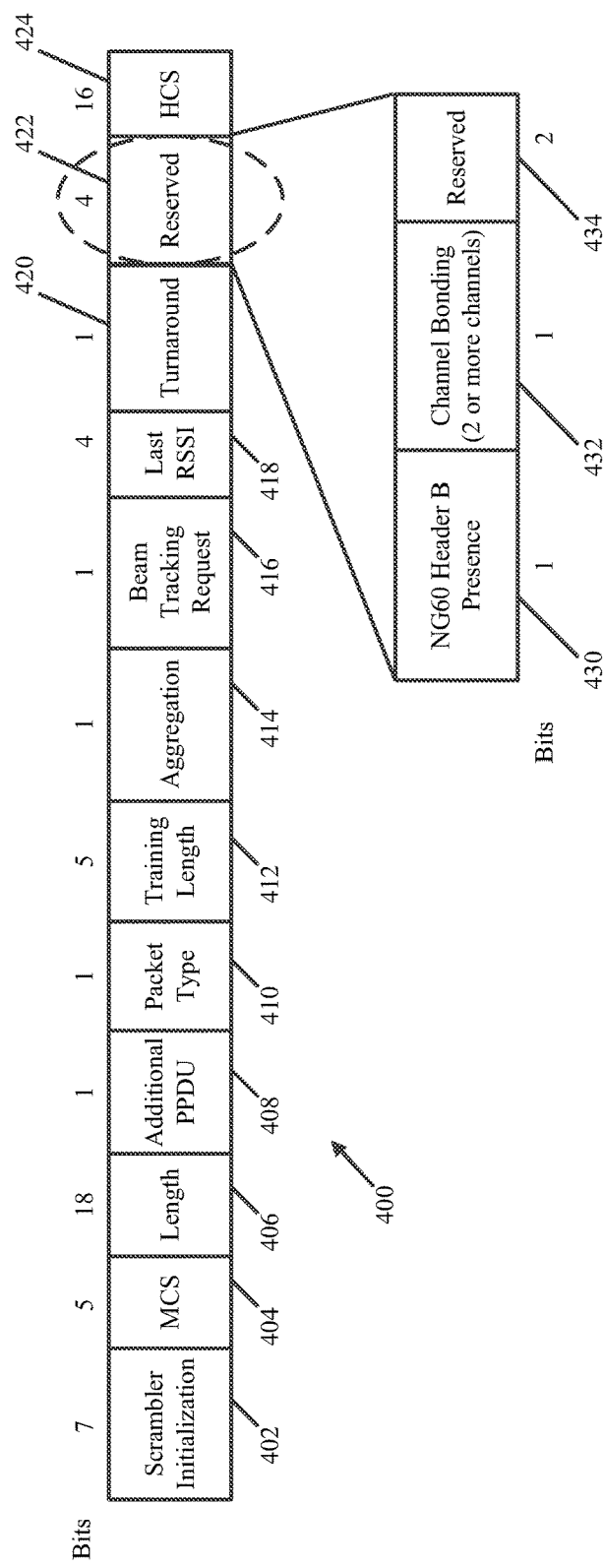
FIG. 4 is a schematic illustration of a header structure, in accordance with some demonstrative embodiments.

Reference is made to FIG. 4, which schematically illustrates a header structure 400, in accordance with some demonstrative embodiments. For example, devices 102 and/or 140 (FIG. 1) may be configured to process transmission and/or reception of the header structure 400 of FIG. 4, e.g., in accordance with the Option 1 scheme.

In some demonstrative embodiments, legacy header 308 (FIG. 3) may have the structure of header 400.

In some demonstrative embodiments, one or more fields of header 400 may include one or more fields of a legacy header structure, for example, in accordance with an IEEE 802.11 Specification, e.g., the IEEE 802.11ad-2012 Specification, and/or any other specification, standard and/or protocol. In one example, the structure of header 400 may be ion accordance with the structure of header 200 (FIG. 2).

In some demonstrative embodiments, header 400 may include a scrambler initialization field 402, an MCS field 404, a length field 406, an Additional PPDU field 408, a packet type field 410, a training length field 412, an aggregation field 414, a beam tracking request field 416, a last Received Signal Strength Indication (RSSI) field 418, a turnaround field 420, a reserved field 422, and/or a Header Check Sequence (HCS) field 424. In other embodiments, header 400 may include any other additional or alternative fields.

In some demonstrative embodiments, as shown in FIG. 4, reserved field 422 may include four reserved bits. In other embodiments, reserved field 422 may include any other number of reserved bits.

In some demonstrative embodiments, a reserved bit 430 of reserved field 422 may be configured as an indication bit ("NG60 Header B Presence" subfield) to indicate, for example, whether or not a non-legacy header, e.g., non-legacy header 312 (FIG. 3), is to be included in a header portion, e.g., header portion 306 (FIG. 3), including header 400.

In some demonstrative embodiments, a wireless station, for example, a wireless station implemented by device 102 (FIG. 1), which is to generate and/or transmit a PPDU, e.g., according to frame structure 300 (FIG. 3), may be configured to set bit 430 to a first value, e.g., 1, for example, to indicate that a non-legacy header, e.g., non-legacy header 312 (FIG. 3), is to be included in the header of the PPDU, e.g., in header portion 306 (FIG. 3).

In some demonstrative embodiments, a wireless station, for example, the wireless station implemented by device 102 (FIG. 1), which is to generate and/or transmit a PPDU, e.g., according to frame structure 300 (FIG. 3), may be configured to set bit 430 to a second value, e.g., 0, for example, to indicate that a non-legacy header, e.g., non-legacy header 312 (FIG. 3), is not to be included in the header of the PPDU, e.g., in header portion 306 (FIG. 3).

In some demonstrative embodiments, a reserved bit 432 of reserved field 422 may be configured as an indication bit ("Channel bonding" subfield) to indicate, for example, whether or not channel bonding is to be applied to a transmission of at least a portion of a frame including header 400.

In some demonstrative embodiments, Channel Bonding subfield 432 may be configured to provide an indication of channel bonding with respect to 2 or more channels. For example, the Channel Bonding subfield 432 may be configured to indicate whether channel bonding is assumed for the current operation or transmission of the PPDU including header 400.

In some demonstrative embodiments, a wireless station, for example, a wireless station implemented by device 102 (FIG. 1), which is to generate and/or transmit a PPDU, e.g., according to frame structure 300 (FIG. 3), may be configured to set bit 432 to a first value, e.g., 1, for example, to indicate that channel bonding is to be applied to communicate one or more portions of the PPDU, e.g., at least data portion 314 (FIG. 3), AGC field 316 (FIG. 3), and/or TRN field 318 (FIG. 3).

In some demonstrative embodiments, a wireless station, for example, a wireless station implemented by device 102 (FIG. 1), which is to generate and/or transmit a PPDU, e.g., according to frame structure 300 (FIG. 3), may be configured to set bit 432 to a second value, e.g., 0, for example, to indicate that channel bonding is not to be applied to communicate one or more portions of the PPDU, e.g., at least data portion 314 (FIG. 3), AGC field 316 (FIG. 3) and/or TRN field 318 (FIG. 3).

In some demonstrative embodiments, a wireless station, for example, a wireless station implemented by device 102 (FIG. 1), which is to generate and/or transmit a PPDU, e.g., according to frame structure 300 (FIG. 3), may be configured to set the values in both subfields 430 and 432 to "1", for example, to indicate that the header of the PPDU, e.g., header portion 306, is to include a non-legacy header, e.g., non-legacy header 312 (FIG. 3), and that channel bonding is to be applied to communicate one or more portions of the PPDU, e.g., at least data portion 314 (FIG. 3, AGC field 316 (FIG. 3) and/or TRN field 318 (FIG. 3).

Referring back to FIG. 3, in some demonstrative embodiments, non-legacy header 310 may include the first indication and/or the second indication, e.g., as described below.

In some demonstrative embodiments, non-legacy header 310 may include both the first indication and the second indication, e.g., as described below.

In some demonstrative embodiments, according to a second scheme ("Option 2"), an indication and/or signaling of the presence of non-legacy header 312, and/or an indication of channel bonding, may be included in non-legacy header 310, e.g., as described below.

In some demonstrative embodiments, including in non-legacy header 310 the indication of whether or not non-legacy header 312 is present in header portion 306 may be advantageous, for example, by enabling to avoid a modification of legacy header 308.

Figure 5:
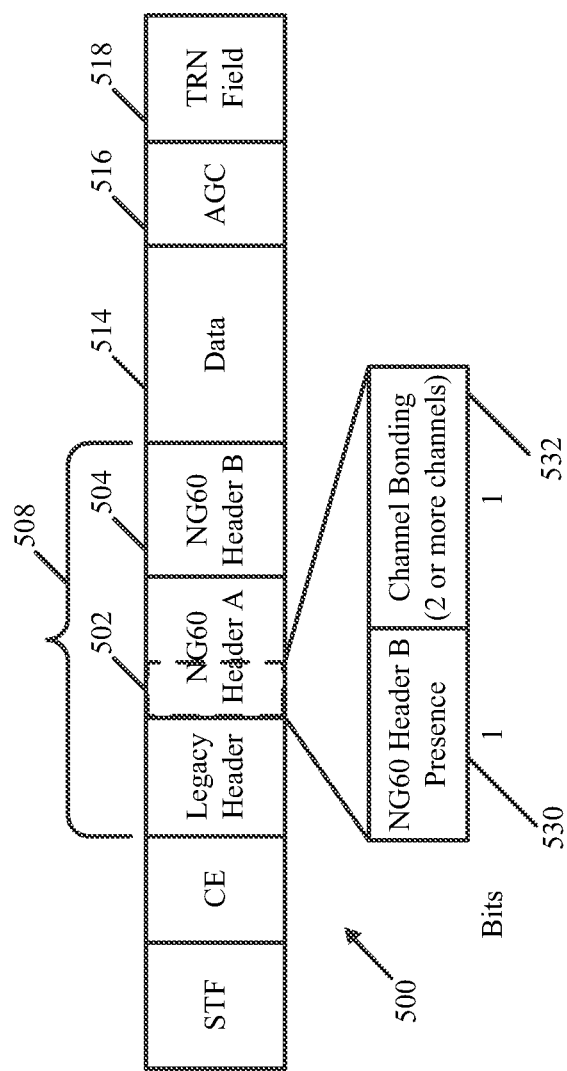
FIG. 5 is a schematic illustration of subfields of a non-legacy header in a frame structure, in accordance with some demonstrative embodiments.

Reference is made to FIG. 5, which schematically illustrates subfields of a non-legacy header 502 in a frame structure 500, in accordance with some demonstrative embodiments. For example, devices 102 and/or 140 (FIG. 1) may be configured to process transmission and/or reception of the header structure 500 of FIG. 5, e.g., in accordance with the Option 2 scheme.

In some demonstrative embodiments, frame structure 500 may one or more of the fields of frame structure 300 (FIG. 3), e.g., as described above.

In some demonstrative embodiments, non-legacy header 310 (FIG. 3) may include, for example, one or more of the subfields of non-legacy header 502.

In some demonstrative embodiments, non-legacy header 502 may include an indication subfield ("NG60 Header B Presence" subfield) 530, e.g., including one bit, to indicate, for example, whether or not a non-legacy header 504, e.g., non-legacy header 312 (FIG. 3), is to be included in a header portion 508, e.g., header portion 306 (FIG. 3), of frame 500.

In some demonstrative embodiments, a wireless station, for example, a wireless station implemented by device 102 (FIG. 1), which is to generate and/or transmit a PPDU, e.g., according to frame structure 500, may be configured to set subfield 530 to a first value, e.g., 1, for example, to indicate that non-legacy header 504, e.g., non-legacy header 312 (FIG. 3), is to be included in header portion 508, e.g., in header portion 306 (FIG. 3).

In some demonstrative embodiments, a wireless station, for example, a wireless station implemented by device 102 (FIG. 1), which is to generate and/or transmit a PPDU, e.g., according to frame structure 500, may be configured to set subfield 530 to a second value, e.g., 0, for example, to indicate that non-legacy header 504, e.g., non-legacy header 312 (FIG. 3), is not to be included in header portion 508, e.g., in header portion 306 (FIG. 3).

In some demonstrative embodiments, non-legacy header 502 may include an indication subfield ("Channel bonding" subfield) 532, e.g., including one bit, to indicate, for example, whether or not channel bonding is to be applied to a transmission of one or more portions of frame 500, for example, a data portion 514, an AGC field 516, and/or a TRN field 518.

In some demonstrative embodiments, Channel Bonding subfield 532 may be configured to provide an indication of channel bonding with respect to two or more channels. For example, the Channel Bonding subfield 532 may be configured to indicate whether channel bonding is assumed for the current operation or transmission of one or more portions of frame 500, for example, data portion 514, AGC field 516, and/or TRN field 518.

In some demonstrative embodiments, a wireless station, for example, a wireless station implemented by device 102 (FIG. 1), which is to generate and/or transmit a PPDU, e.g., according to frame structure 500, may be configured to set subfield 532 to a first value, e.g., 1, for example, to indicate that channel bonding is to be applied to communicate one or more portions of the PPDU, e.g., at least data portion 514, AGC field 516, and/or TRN field 518.

In some demonstrative embodiments, a wireless station, for example, a wireless station implemented by device 102 (FIG. 1), which is to generate and/or transmit a PPDU, e.g., according to frame structure 500, may be configured to set subfield 532 to a second value, e.g., 0, for example, to indicate that channel bonding is not to be applied to communicate one or more portions of the PPDU, e.g., at least data portion 514, AGC field 516, and/or TRN field 518.

In some demonstrative embodiments, a wireless station, for example, a wireless station implemented by device 102 (FIG. 1), which is to generate and/or transmit a PPDU, e.g., according to frame structure 500, may be configured to set the values in both subfields 530 and 532 to "1", for example, to indicate that the header of the PPDU, e.g., header portion 508, is to include a non-legacy header, e.g., non-legacy header 504, and that channel bonding is to be applied to communicate one or more portions of the PPDU, e.g., at least data portion 514, AGC field 516, and/or TRN field 518.

Referring back to FIG. 3, in some demonstrative embodiments, header portion 506 may be configured to include an indication of two or more channels to be bonded, for example, if channel bonding is to be used, e.g., as described below.

In some demonstrative embodiments, devices 102 and/or 140 (FIG. 1) may be configured to process reception and/or transmission of the indication of the channels to be bonded, for example, if channel bonding is to be used, e.g., as described below.

In some demonstrative embodiments, header portion 306 may be configured to include the indication of the channels to be bonded, for example, in case the Channel Bonding subfield, e.g., subfield 432 (FIG. 3) or subfield 532 (FIG. 5), includes a value, e.g., "1", to indicate that channel bonding is to be used.

In some demonstrative embodiments, the indication of the channels to be bonded may provide, for example, a least an indication with respect to the number of channels that are to be bonded, e.g., to obtain the bandwidth of an operating channel.

In some demonstrative embodiments, the indication of two or more channels to be bonded may be included in a non-legacy header, for example, non-legacy header 310, e.g., as described below.

In other embodiments, the indication of two or more channels to be bonded may be included in any other non-legacy header, in any other element of header portion 306, and/or in any other element of frame 300.

In some demonstrative embodiments, according to a first scheme ("Option A"), non-legacy header 310 may include a Channel Bitmap field 360, for example, if channel bonding is to be applied.

In some demonstrative embodiments, channel bitmap field 360 may be included in non-legacy header 310, for example, when the Channel Bonding subfield, e.g., subfield 432 (FIG. 3) or subfield 532 (FIG. 5), includes a value, e.g., "1", to indicate that channel bonding is to be used.

In some demonstrative embodiments, channel bitmap field 360 may be absent from non-legacy header 310, for example, when the Channel Bonding subfield, e.g., subfield 432 (FIG. 3) or subfield 532 (FIG. 5), includes a value, e.g., "0", to indicate that channel bonding is not to be used.

In some demonstrative embodiments, channel bitmap field 360 may include, for example, 1 bit octet, e.g., corresponding to eight channels, or any other number of bits corresponding to any other number of channels.

In some demonstrative embodiments, channel bitmap field 360 may include a sequence of a plurality of bits corresponding to a respective plurality of channels. For example, a bit of the sequence of bits may be set to have a value to indicate whether or not a respective channel of the plurality of channels is to be bonded.

In some demonstrative embodiments, a bit in the channel bitmap 360, e.g., each bit in the bitmap 360, may be configured to represent one channel.

In some demonstrative embodiments, a wireless station, for example, a wireless station implemented by device 102 (FIG. 1), which is to generate and/or transmit a PPDU, e.g., according to frame structure 300, may be configured to set a value in a bit location of bitmap 360 to indicate whether or not a channel corresponding to the bit location is to be bonded.

In some demonstrative embodiments, a wireless station, for example, a wireless station implemented by device 102 (FIG. 1), which is to generate and/or transmit a PPDU, e.g., according to frame structure 300, may be configured to set the bit location of bitmap 360 to a first value, e.g., "1", to indicate that the channel corresponding to the bit location is to be bonded.

In some demonstrative embodiments, a wireless station, for example, a wireless station implemented by device 102 (FIG. 1), which is to generate and/or transmit a PPDU, e.g., according to frame structure 300, may be configured to set the bit location of bitmap 360 to a second value, e.g., "0", to indicate that the channel corresponding to the bit location is not to be bonded.

In one example, a wireless station, for example, a wireless station implemented by device 102 (FIG. 1), which is to generate and/or transmit a PPDU, e.g., according to frame structure 300, may be configured to set a sequence of "10000001" in the Channel Bitmap 360, for example, to indicate that the first and eighth channels are to be bonded.

In some demonstrative embodiments, the channel bitmap field 360 may be configured to enable, for example, bonding of two or more contiguous channels and/or two or more non-contiguous channels.

In some demonstrative embodiments, according to a second scheme ("Option B"), non-legacy header 360 may include one or more information fields, for example, a primary channel field 370 and/or a channel bandwidth (CH_BW) field 372, for example, if channel bonding is to be applied.

In some demonstrative embodiments, primary channel field 370 and/or channel BW field 372 may be included in non-legacy header 310, for example, when the Channel Bonding subfield, e.g., subfield 432 (FIG. 3) or subfield 532 (FIG. 5), includes a value, e.g., "1", to indicate that channel bonding is to be used.

In some demonstrative embodiments, primary channel field 370 and/or channel BW field 372 may be absent from non-legacy header 310, for example, when the Channel Bonding subfield, e.g., subfield 432 (FIG. 3) or subfield 532 (FIG. 5), includes a value, e.g., "0", to indicate that channel bonding is not to be used.

In some demonstrative embodiments, a CH_BW field 372 may be configured to indicate a bandwidth of a bonded channel In some demonstrative embodiments, a Primary Channel field 370 may be configured, for example, to indicate a primary channel of two or more channels to be bonded.

In some demonstrative embodiments, primary channel field 370 may include, for example, a channel number corresponding to a primary channel, for example, that a BSS may be currently operating on, or any other primary channel of a network.

In some demonstrative embodiments, a CH_BW field 372 may be configured, for example, to indicate a number of contiguous channels to be bonded.

For example, a receiving STA, e.g., device 140 (FIG. 1), which receives a transmission, e.g., frame 300, including the CH_BW field 372, may be configured to determine a number of channels to be bonded, for example, by dividing the value in the CH_BW field 372 by a bandwidth value of a single channel bandwidth, for example, a predefined channel bandwidth, e.g., as may be used in a NG60 network or in any other network. The number obtained as a result of the division may be the number of channels to be bonded. For example, the result of dividing the value in the CH_BW field 362 by the value of a single channel bandwidth may be the number of secondary channels to be bonded, e.g., starting from (and including), a primary channel indicated by the Primary Channel field 370.

In some demonstrative embodiments, the Option B scheme may be applicable, for example, for contiguous channel bonding.

Referring back to FIG. 1, in some demonstrative embodiments, controller 124 may be configured to cause a wireless station, for example, a wireless station implemented by device 102, to generate a frame including a header portion, the header portion including a legacy header, followed by a first non-legacy header, e.g., in accordance with the structure of frame 300 (FIG. 3). For example, controller 124 may cause message processor 128 to generate the frame including header portion 306 (FIG. 3), which may include legacy header 308 (FIG. 3) followed by non-legacy header 310 (FIG. 3).

In some demonstrative embodiments, controller 124 may be configured to cause the wireless station to generate the header portion including a first indication to indicate whether or not the header portion is to include a second non-legacy header following the first non-legacy header. For example, controller 124 may cause message processor 128 to generate header portion 306 (FIG. 3) including the indication of whether or not non-legacy header 312 (FIG. 3) is to be included in header portion 306 (FIG. 3).

In some demonstrative embodiments, controller 124 may be configured to cause the wireless station to include subfield 430 (FIG. 3), e.g., in reserved field 422 (FIG. 4) of legacy header 308 (FIG. 3); or to include subfield 530 (FIG. 5) in non-legacy header 502 (FIG. 5), e.g., as described above.

In some demonstrative embodiments, controller 124 may be configured to cause the wireless station to generate the header portion including a second indication to indicate whether or not channel bonding is to be used. For example, controller 124 may cause message processor 128 to generate header portion 306 (FIG. 3) including the indication of whether or not channel bonding is to be used to communicate at least a portion of frame 300 (FIG. 3).

In some demonstrative embodiments, controller 124 may be configured to cause the wireless station to include subfield 432 (FIG. 3), e.g., in reserved field 422 (FIG. 4) of legacy header 308 (FIG. 3); or to include subfield 532 (FIG. 5) in non-legacy header 502 (FIG. 5), e.g., as described above.

In some demonstrative embodiments, controller 124 may be configured to cause the wireless station to include in the first non-legacy header a channel bitmap to indicate two or more channels to be bonded, for example, when the second indication is to indicate channel bonding is to be used. For example, controller 124 may cause message processor 128 to generate non-legacy header 310 (FIG. 3) including bitmap field 360 (FIG. 3), for example, when subfield 430 (FIG. 4) is set to "1", or when subfield 530 (FIG. 5) is set to "1".

In some demonstrative embodiments, controller 124 may be configured to cause the wireless station to include in the first non-legacy header a first field to indicate a primary channel to be used for channel bonding, and a second field to indicate a channel bandwidth to be used for the channel bonding, for example, when the second indication is to indicate channel bonding is to be used. For example, controller 124 may cause message processor 128 to generate non-legacy header 310 (FIG. 3) including field 370 (FIG. 3) and/or field 372 (FIG. 3), for example, when subfield 432 (FIG. 4) is set to "1", or when subfield 532 (FIG. 5) is set to "1".

In some demonstrative embodiments, controller 124 may be configured to cause the wireless station to process transmission of the frame to at least one second wireless station over a directional wireless communication band. For example, controller 124 may cause message processor 128 and/or radio 114 to process transmission of frame 300 (FIG. 3) to at least one second wireless station, e.g., the wireless station implemented by device 140 and/or one or more other wireless stations.

In some demonstrative embodiments, controller 124 may be configured to cause the wireless station to transmit at least a data portion of the frame over a bonded channel, when the second indication is to indicate channel bonding is to be used. For example, controller 124 may cause radio 114 to transmit at least data portion 314 (FIG. 3) over the bonded channel, for example, when subfield 432 (FIG. 4) is set to "1", or when subfield 532 (FIG. 5) is set to "1".

In some demonstrative embodiments, controller 124 may be configured to cause the wireless station to transmit at least a data portion of the frame according to one or more parameters in the first non-legacy header. For example, controller 124 may cause radio 114 to transmit at least data portion 314 (FIG. 3) according to one or more of the parameters in non-legacy header 310 (FIG. 3).

In some demonstrative embodiments, controller 124 may be configured to cause the wireless station to transmit at least a data portion of the frame to a plurality of users, e.g., according to one or more MU-MIMO parameters in the second non-legacy header, for example, when the header portion is to include the second non-legacy header. For example, controller 124 may cause radio 114 to transmit at least data portion 314 (FIG. 3) according to one or more of the parameters in non-legacy header 312 (FIG. 3), for example, when subfield 430 (FIG. 4) is set to "1", or when subfield 530 (FIG. 5) is set to "1".

In some demonstrative embodiments, controller 154 may be configured to cause a wireless station, for example, a wireless station implemented by device 140, to process reception of a frame ("the received frame") including a header portion, the header portion including a legacy header, followed by a first non-legacy header, e.g., in accordance with the structure of frame 300 (FIG. 3). For example, controller 154 may cause message processor 158 to process reception of the frame including header portion 306 (FIG. 3), which may include legacy header 308 (FIG. 3) followed by non-legacy header 310 (FIG. 3).

In one example, the received frame may include the frame transmitted by device 102.

In some demonstrative embodiments, controller 154 may be configured to cause the wireless station to process reception of at least a data portion of the frame based at least on the first non-legacy header.

In some demonstrative embodiments, controller 154 may be configured to cause the wireless station to process reception of at least a data portion of the frame over a bonded channel, when the second indication is to indicate channel bonding is to be used. For example, controller 154 may cause radio 144 and/or message processor 158 to process reception of at least data portion 314 (FIG. 3) over the bonded channel, for example, when subfield 432 (FIG. 4) is set to "1", or when subfield 532 (FIG. 5) is set to "1".

In some demonstrative embodiments, controller 154 may be configured to cause the wireless station to process reception of at least a data portion of the frame according to one or more parameters in the first non-legacy header. For example, controller 154 may cause radio 144 and/or message processor 158 to process reception of at least data portion 314 (FIG. 3) according to one or more of the parameters in non-legacy header 310 (FIG. 3).

In some demonstrative embodiments, controller 154 may be configured to cause the wireless station to process reception of at least a data portion of the frame according to one or more MU-MIMO parameters in the second non-legacy header, for example, when the header portion is to include the second non-legacy header. For example, controller 154 may cause radio 144 and/or message processor 158 to process reception of at least data portion 314 (FIG. 3) according to one or more of the parameters in non-legacy header 312 (FIG. 3), for example, when subfield 430 (FIG. 4) is set to "1", or when subfield 530 (FIG. 5) is set to "1".

Figure 6:
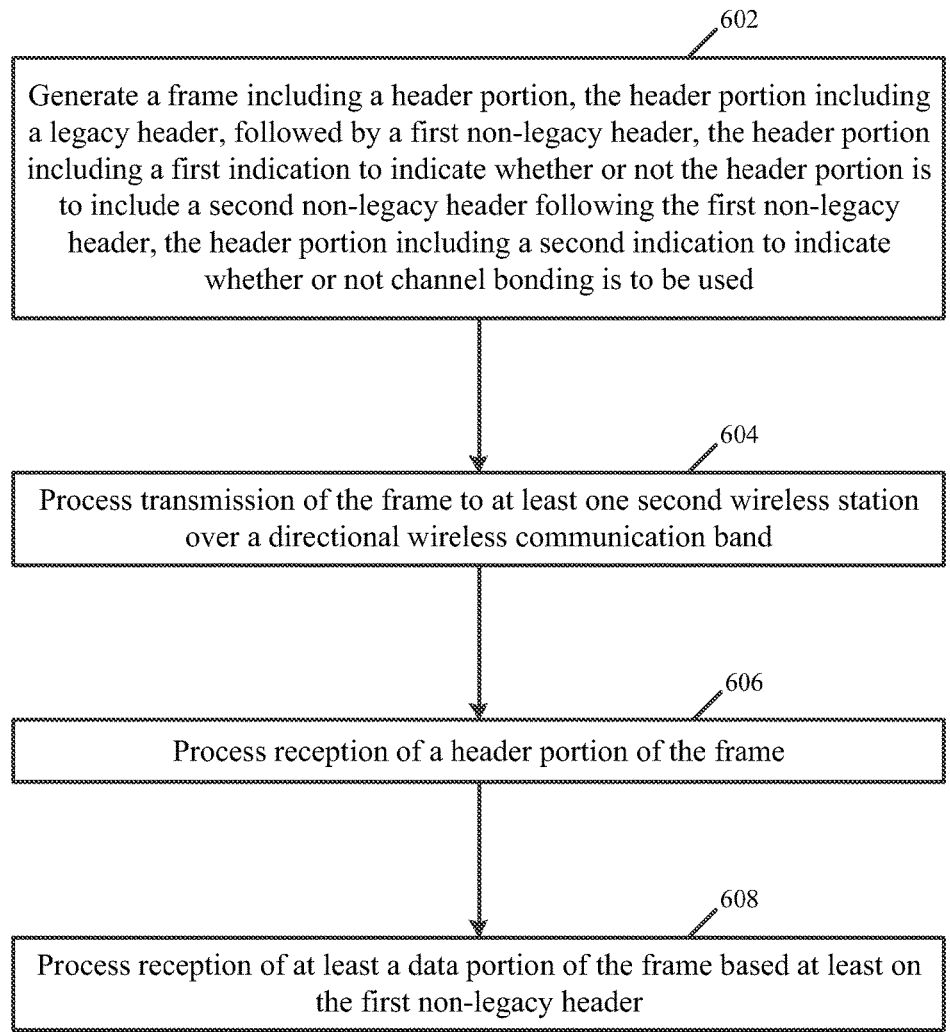
FIG. 6 is a schematic flow-chart illustration of a method of communicating a wireless communication frame, in accordance with some demonstrative embodiments.

Reference is made to FIG. 6, which schematically illustrates a method of communicating a wireless communication frame, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include generating a frame including a header portion, the header portion including a legacy header, followed by a first non-legacy header, the header portion including a first indication to indicate whether or not the header portion is to include a second non-legacy header following the first non-legacy header, the header portion including a second indication to indicate whether or not channel bonding is to be used. For example, controller 124 (FIG. 1) may cause message processor 128 (FIG. 1) to generate frame 300 (FIG. 3) including header portion 306 (FIG. 3), e.g., as described above.

As indicated at block 604, the method may include processing transmission of the frame to at least one second wireless station over a directional wireless communication band. For example, controller 124 (FIG. 1) may cause message processor 128 (FIG. 1) and/or radio 114 (FIG. 1) to process transmission of frame 300 (FIG. 3) to at least one second wireless station via a directional band, for example, a DMG band, e.g., as described above.

As indicated at block 606, the method may include processing reception of a header portion of the frame. For example, controller 154 (FIG. 1) may cause message processor 158 (FIG. 1) and/or radio 144 (FIG. 1) to process reception of the header portion 306 (FIG. 3) of the frame 300 (FIG. 3), e.g., as described above.

As indicated at block 608 the method may include processing reception of at least a data portion of the frame based at least on the first non-legacy header. For example, controller 154 (FIG. 1) may cause message processor 158 (FIG. 1) and/or radio 144 (FIG. 1) to process reception of at least data portion 314 (FIG. 3) of the frame 300 (FIG. 3), for example, based at least one non-legacy header 310 (FIG. 3), e.g., as described above.

Figure 7:
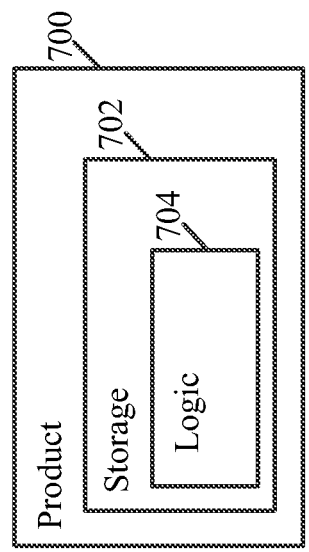
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations and/or functionalities, for example, one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless station to generate a frame comprising a header portion, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and process transmission of the frame to at least one second wireless station over a directional wireless communication band.

Example 2 includes the subject matter of Example 1, and optionally, wherein the legacy header comprises the first and second indications.

Example 3 includes the subject matter of Example 1, and optionally, wherein the first non-legacy header comprises the first and second indications.

Example 4 includes the subject matter of any one of Examples 1-3, and optionally, wherein the first non-legacy header comprises a channel bitmap to indicate two or more channels to be bonded, when the second indication is to indicate channel bonding is to be used.

Example 5 includes the subject matter of Example 4, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 6 includes the subject matter of Example 5, and optionally, wherein two non-consecutive bits of the sequence of bits have a value to indicate that two non-contiguous channels are to be bonded.

Example 7 includes the subject matter of any one of Examples 1-3, and optionally, wherein the first non-legacy header comprises a first field to indicate a primary channel to be used for channel bonding, and a second field to indicate a channel bandwidth to be used for the channel bonding.

Example 8 includes the subject matter of any one of Examples 1-7, and optionally, configured to cause the first wireless station to transmit at least a data portion of the frame over a bonded channel, when the second indication is to indicate channel bonding is to be used.

Example 9 includes the subject matter of any one of Examples 1-8, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 10 includes the subject matter of Example 9, and optionally, configured to cause the first wireless station to transmit at least the data portion of the frame according to the one or more parameters.

Example 11 includes the subject matter of any one of Examples 1-10, and optionally, wherein the header portion is to comprise the second non-legacy header, the second non-legacy header comprising one or more Multi-User (MU) Multi-Input-Multi-Output (MIMO) (MU-MIMO) parameters.

Example 12 includes the subject matter of Example 11, and optionally, configured to cause the first wireless station to transmit at least a data portion of the frame to a plurality of users according to the MU-MIMO parameters.

Example 13 includes the subject matter of any one of Examples 1-12, and optionally, wherein the legacy header comprises a Single Carrier (SC) header.

Example 14 includes the subject matter of any one of Examples 1-13, and optionally, wherein the directional wireless communication band is a Directional Multi-Gigabit (DMG) band.

Example 15 includes the subject matter of any one of Examples 1-14, and optionally, wherein the first wireless station is a Directional Multi-Gigabit (DMG) Station (STA).

Example 16 includes the subject matter of any one of Examples 1-15, and optionally, comprising a radio to transmit the frame.

Example 17 includes the subject matter of any one of Examples 1-16, and optionally, comprising one or more directional antennas, a memory, and a processor.

Example 18 includes an apparatus comprising circuitry configured to cause a first wireless station to process reception of a header portion of a frame from a second wireless station over a directional wireless communication band, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and process reception of at least a data portion of the frame based at least on the first non-legacy header.

Example 19 includes the subject matter of Example 18, and optionally, wherein the legacy header comprises the first and second indications.

Example 20 includes the subject matter of Example 18, and optionally, wherein the first non-legacy header comprises the first and second indications.

Example 21 includes the subject matter of any one of Examples 18-20, and optionally, wherein the first non-legacy header comprises a channel bitmap to indicate two or more channels to be bonded, when the second indication is to indicate channel bonding is to be used.

Example 22 includes the subject matter of Example 21, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 23 includes the subject matter of Example 22, and optionally, wherein two non-consecutive bits of the sequence of bits have a value to indicate that two non-contiguous channels are to be bonded.

Example 24 includes the subject matter of any one of Examples 18-20, and optionally, wherein the first non-legacy header comprises a first field to indicate a primary channel to be used for channel bonding, and a second field to indicate a channel bandwidth to be used for the channel bonding.

Example 25 includes the subject matter of any one of Examples 18-24, and optionally, configured to cause the first wireless station to process reception of at least the data portion of the frame over a bonded channel, when the second indication is to indicate channel bonding is to be used.

Example 26 includes the subject matter of any one of Examples 18-25, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 27 includes the subject matter of Example 26, and optionally, configured to cause the first wireless station to process reception of at least the data portion of the frame according to the one or more parameters.

Example 28 includes the subject matter of any one of Examples 18-27, and optionally, wherein the header portion is to comprise the second non-legacy header, the second non-legacy header comprising one or more Multi-User (MU) Multi-Input-Multi-Output (MIMO) (MU-MIMO) parameters.

Example 29 includes the subject matter of Example 28, and optionally, configured to cause the first wireless station to process reception of at least the data portion of the frame according to the MU-MIMO parameters.

Example 30 includes the subject matter of any one of Examples 18-29, and optionally, wherein the legacy header comprises a Single Carrier (SC) header.

Example 31 includes the subject matter of any one of Examples 18-30, and optionally, wherein the directional wireless communication band is a Directional Multi-Gigabit (DMG) band.

Example 32 includes the subject matter of any one of Examples 18-31, and optionally, wherein the first wireless station is a Directional Multi-Gigabit (DMG) Station (STA).

Example 33 includes the subject matter of any one of Examples 18-32, and optionally, comprising a radio to receive the frame.

Example 34 includes the subject matter of any one of Examples 18-33, and optionally, comprising one or more directional antennas, a memory, and a processor.

Example 35 includes a method to be performed at a first wireless station, the method comprising generating a frame comprising a header portion, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and processing transmission of the frame to at least one second wireless station over a directional wireless communication band.

Example 36 includes the subject matter of Example 35, and optionally, wherein the legacy header comprises the first and second indications.

Example 37 includes the subject matter of Example 35, and optionally, wherein the first non-legacy header comprises the first and second indications.

Example 38 includes the subject matter of any one of Examples 35-37, and optionally, wherein the first non-legacy header comprises a channel bitmap to indicate two or more channels to be bonded, when the second indication is to indicate channel bonding is to be used.

Example 39 includes the subject matter of Example 38, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 40 includes the subject matter of Example 39, and optionally, wherein two non-consecutive bits of the sequence of bits have a value to indicate that two non-contiguous channels are to be bonded.

Example 41 includes the subject matter of any one of Examples 35-37, and optionally, wherein the first non-legacy header comprises a first field to indicate a primary channel to be used for channel bonding, and a second field to indicate a channel bandwidth to be used for the channel bonding.

Example 42 includes the subject matter of any one of Examples 35-41, and optionally, comprising transmitting at least a data portion of the frame over a bonded channel, when the second indication is to indicate channel bonding is to be used.

Example 43 includes the subject matter of any one of Examples 35-42, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 44 includes the subject matter of Example 43, and optionally, comprising transmitting at least the data portion of the frame according to the one or more parameters.

Example 45 includes the subject matter of any one of Examples 35-44, and optionally, wherein the header portion is to comprise the second non-legacy header, the second non-legacy header comprising one or more Multi-User (MU) Multi-Input-Multi-Output (MIMO) (MU-MIMO) parameters.

Example 46 includes the subject matter of Example 45, and optionally, comprising transmitting at least a data portion of the frame to a plurality of users according to the MU-MIMO parameters.

Example 47 includes the subject matter of any one of Examples 35-46, and optionally, wherein the legacy header comprises a Single Carrier (SC) header.

Example 48 includes the subject matter of any one of Examples 35-47, and optionally, wherein the directional wireless communication band is a Directional Multi-Gigabit (DMG) band.

Example 49 includes the subject matter of any one of Examples 35-48, and optionally, wherein the first wireless station is a Directional Multi-Gigabit (DMG) Station (STA).

Example 50 includes a product comprising one or more tangible computer-readable non-transitory storage media comprising computer-executable instructions operable to, when executed by at least one computer processor, enable the at least one computer processor to implement one or more operations at a first wireless station, the operations comprising generating a frame comprising a header portion, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and processing transmission of the frame to at least one second wireless station over a directional wireless communication band.

Example 51 includes the subject matter of Example 50, and optionally, wherein the legacy header comprises the first and second indications.

Example 52 includes the subject matter of Example 50, and optionally, wherein the first non-legacy header comprises the first and second indications.

Example 53 includes the subject matter of any one of Examples 50-52, and optionally, wherein the first non-legacy header comprises a channel bitmap to indicate two or more channels to be bonded, when the second indication is to indicate channel bonding is to be used.

Example 54 includes the subject matter of Example 53, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 55 includes the subject matter of Example 54, and optionally, wherein two non-consecutive bits of the sequence of bits have a value to indicate that two non-contiguous channels are to be bonded.

Example 56 includes the subject matter of any one of Examples 50-52, and optionally, wherein the first non-legacy header comprises a first field to indicate a primary channel to be used for channel bonding, and a second field to indicate a channel bandwidth to be used for the channel bonding.

Example 57 includes the subject matter of any one of Examples 50-56, and optionally, wherein the operations comprise transmitting at least a data portion of the frame over a bonded channel, when the second indication is to indicate channel bonding is to be used.

Example 58 includes the subject matter of any one of Examples 50-57, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 59 includes the subject matter of Example 58, and optionally, wherein the operations comprise transmitting at least the data portion of the frame according to the one or more parameters.

Example 60 includes the subject matter of any one of Examples 50-59, and optionally, wherein the header portion is to comprise the second non-legacy header, the second non-legacy header comprising one or more Multi-User (MU) Multi-Input-Multi-Output (MIMO) (MU-MIMO) parameters.

Example 61 includes the subject matter of Example 60, and optionally, wherein the operations comprise transmitting at least a data portion of the frame to a plurality of users according to the MU-MIMO parameters.

Example 62 includes the subject matter of any one of Examples 50-61, and optionally, wherein the legacy header comprises a Single Carrier (SC) header.

Example 63 includes the subject matter of any one of Examples 50-62, and optionally, wherein the directional wireless communication band is a Directional Multi-Gigabit (DMG) band.

Example 64 includes the subject matter of any one of Examples 50-63, and optionally, wherein the first wireless station is a Directional Multi-Gigabit (DMG) Station (STA).

Example 65 includes a system of wireless communication comprising a first wireless station, the first wireless station comprising one or more directional antennas; a memory; a processor; and a radio to transmit a frame to at least one second wireless station over a directional wireless communication band, the frame comprising a header portion, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used.

Example 66 includes the subject matter of Example 65, and optionally, wherein the legacy header comprises the first and second indications.

Example 67 includes the subject matter of Example 65, and optionally, wherein the first non-legacy header comprises the first and second indications.

Example 68 includes the subject matter of any one of Examples 65-67, and optionally, wherein the first non-legacy header comprises a channel bitmap to indicate two or more channels to be bonded, when the second indication is to indicate channel bonding is to be used.

Example 69 includes the subject matter of Example 68, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 70 includes the subject matter of Example 69, and optionally, wherein two non-consecutive bits of the sequence of bits have a value to indicate that two non-contiguous channels are to be bonded.

Example 71 includes the subject matter of any one of Examples 65-67, and optionally, wherein the first non-legacy header comprises a first field to indicate a primary channel to be used for channel bonding, and a second field to indicate a channel bandwidth to be used for the channel bonding.

Example 72 includes the subject matter of any one of Examples 65-71, and optionally, wherein the radio is to transmit at least a data portion of the frame over a bonded channel, when the second indication is to indicate channel bonding is to be used.

Example 73 includes the subject matter of any one of Examples 65-72, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 74 includes the subject matter of Example 73, and optionally, wherein the radio is to transmit at least the data portion of the frame according to the one or more parameters.

Example 75 includes the subject matter of any one of Examples 65-74, and optionally, wherein the header portion is to comprise the second non-legacy header, the second non-legacy header comprising one or more Multi-User (MU) Multi-Input-Multi-Output (MIMO) (MU-MIMO) parameters.

Example 76 includes the subject matter of Example 75, and optionally, wherein the radio is to transmit at least a data portion of the frame to a plurality of users according to the MU-MIMO parameters.

Example 77 includes the subject matter of any one of Examples 65-76, and optionally, wherein the legacy header comprises a Single Carrier (SC) header.

Example 78 includes the subject matter of any one of Examples 65-77, and optionally, wherein the directional wireless communication band is a Directional Multi-Gigabit (DMG) band.

Example 79 includes the subject matter of any one of Examples 65-78, and optionally, wherein the first wireless station is a Directional Multi-Gigabit (DMG) Station (STA).

Example 80 includes an apparatus of wireless communication, the apparatus comprising means for generating at a first wireless station a frame comprising a header portion, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and means for processing transmission of the frame to at least one second wireless station over a directional wireless communication band.

Example 81 includes the subject matter of Example 80, and optionally, wherein the legacy header comprises the first and second indications.

Example 82 includes the subject matter of Example 80, and optionally, wherein the first non-legacy header comprises the first and second indications.

Example 83 includes the subject matter of any one of Examples 80-82, and optionally, wherein the first non-legacy header comprises a channel bitmap to indicate two or more channels to be bonded, when the second indication is to indicate channel bonding is to be used.

Example 84 includes the subject matter of Example 83, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 85 includes the subject matter of Example 84, and optionally, wherein two non-consecutive bits of the sequence of bits have a value to indicate that two non-contiguous channels are to be bonded.

Example 86 includes the subject matter of any one of Examples 80-82, and optionally, wherein the first non-legacy header comprises a first field to indicate a primary channel to be used for channel bonding, and a second field to indicate a channel bandwidth to be used for the channel bonding.

Example 87 includes the subject matter of any one of Examples 80-86, and optionally, comprising means for transmitting at least a data portion of the frame over a bonded channel, when the second indication is to indicate channel bonding is to be used.

Example 88 includes the subject matter of any one of Examples 80-87, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 89 includes the subject matter of Example 88, and optionally, comprising means for transmitting at least the data portion of the frame according to the one or more parameters.

Example 90 includes the subject matter of any one of Examples 80-89, and optionally, wherein the header portion is to comprise the second non-legacy header, the second non-legacy header comprising one or more Multi-User (MU) Multi-Input-Multi-Output (MIMO) (MU-MIMO) parameters.

Example 91 includes the subject matter of Example 90, and optionally, comprising means for transmitting at least a data portion of the frame to a plurality of users according to the MU-MIMO parameters.

Example 92 includes the subject matter of any one of Examples 80-91, and optionally, wherein the legacy header comprises a Single Carrier (SC) header.

Example 93 includes the subject matter of any one of Examples 80-92, and optionally, wherein the directional wireless communication band is a Directional Multi-Gigabit (DMG) band.

Example 94 includes the subject matter of any one of Examples 80-93, and optionally, wherein the first wireless station is a Directional Multi-Gigabit (DMG) Station (STA).

Example 95 includes a method to be performed at a first wireless station, the method comprising processing reception of a header portion of a frame from a second wireless station over a directional wireless communication band, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and processing reception of at least a data portion of the frame based at least on the first non-legacy header.

Example 96 includes the subject matter of Example 95, and optionally, wherein the legacy header comprises the first and second indications.

Example 97 includes the subject matter of Example 95, and optionally, wherein the first non-legacy header comprises the first and second indications.

Example 98 includes the subject matter of any one of Examples 95-97, and optionally, wherein the first non-legacy header comprises a channel bitmap to indicate two or more channels to be bonded, when the second indication is to indicate channel bonding is to be used.

Example 99 includes the subject matter of Example 98, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 100 includes the subject matter of Example 99, and optionally, wherein two non-consecutive bits of the sequence of bits have a value to indicate that two non-contiguous channels are to be bonded.

Example 101 includes the subject matter of any one of Examples 95-97, and optionally, wherein the first non-legacy header comprises a first field to indicate a primary channel to be used for channel bonding, and a second field to indicate a channel bandwidth to be used for the channel bonding.

Example 102 includes the subject matter of any one of Examples 95-101, and optionally, comprising processing reception of at least the data portion of the frame over a bonded channel, when the second indication is to indicate channel bonding is to be used.

Example 103 includes the subject matter of any one of Examples 95-102, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 104 includes the subject matter of Example 103, and optionally, comprising processing reception of at least the data portion of the frame according to the one or more parameters.

Example 105 includes the subject matter of any one of Examples 95-104, and optionally, wherein the header portion is to comprise the second non-legacy header, the second non-legacy header comprising one or more Multi-User (MU) Multi-Input-Multi-Output (MIMO) (MU-MIMO) parameters.

Example 106 includes the subject matter of Example 105, and optionally, comprising processing reception of at least the data portion of the frame according to the MU-MIMO parameters.

Example 107 includes the subject matter of any one of Examples 95-106, and optionally, wherein the legacy header comprises a Single Carrier (SC) header.

Example 108 includes the subject matter of any one of Examples 95-107, and optionally, wherein the directional wireless communication band is a Directional Multi-Gigabit (DMG) band.

Example 109 includes the subject matter of any one of Examples 95-108, and optionally, wherein the first wireless station is a Directional Multi-Gigabit (DMG) Station (STA).

Example 110 includes a product comprising one or more tangible computer-readable non-transitory storage media comprising computer-executable instructions operable to, when executed by at least one computer processor, enable the at least one computer processor to implement one or more operations at a first wireless station, the operations comprising processing reception of a header portion of a frame from a second wireless station over a directional wireless communication band, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and processing reception of at least a data portion of the frame based at least on the first non-legacy header.

Example 111 includes the subject matter of Example 110, and optionally, wherein the legacy header comprises the first and second indications.

Example 112 includes the subject matter of Example 110, and optionally, wherein the first non-legacy header comprises the first and second indications.

Example 113 includes the subject matter of any one of Examples 110-112, and optionally, wherein the first non-legacy header comprises a channel bitmap to indicate two or more channels to be bonded, when the second indication is to indicate channel bonding is to be used.

Example 114 includes the subject matter of Example 113, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 115 includes the subject matter of Example 114, and optionally, wherein two non-consecutive bits of the sequence of bits have a value to indicate that two non-contiguous channels are to be bonded.

Example 116 includes the subject matter of any one of Examples 110-112, and optionally, wherein the first non-legacy header comprises a first field to indicate a primary channel to be used for channel bonding, and a second field to indicate a channel bandwidth to be used for the channel bonding.

Example 117 includes the subject matter of any one of Examples 110-116, and optionally, wherein the operations comprise processing reception of at least the data portion of the frame over a bonded channel, when the second indication is to indicate channel bonding is to be used.

Example 118 includes the subject matter of any one of Examples 110-117, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 119 includes the subject matter of Example 118, and optionally, wherein the operations comprise processing reception of at least the data portion of the frame according to the one or more parameters.

Example 120 includes the subject matter of any one of Examples 110-119, and optionally, wherein the header portion is to comprise the second non-legacy header, the second non-legacy header comprising one or more Multi-User (MU) Multi-Input-Multi-Output (MIMO) (MU-MIMO) parameters.

Example 121 includes the subject matter of Example 120, and optionally, wherein the operations comprise processing reception of at least the data portion of the frame according to the MU-MIMO parameters.

Example 122 includes the subject matter of any one of Examples 110-121, and optionally, wherein the legacy header comprises a Single Carrier (SC) header.

Example 123 includes the subject matter of any one of Examples 110-122, and optionally, wherein the directional wireless communication band is a Directional Multi-Gigabit (DMG) band.

Example 124 includes the subject matter of any one of Examples 110-123, and optionally, wherein the first wireless station is a Directional Multi-Gigabit (DMG) Station (STA).

Example 125 includes a system of wireless communication comprising a first wireless station, the first wireless station comprising one or more directional antennas; a memory; a processor; and a radio to process reception of a header portion of a frame from a second wireless station over a directional wireless communication band, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used, and to process reception of at least a data portion of the frame based at least on the first non-legacy header.

Example 126 includes the subject matter of Example 125, and optionally, wherein the legacy header comprises the first and second indications.

Example 127 includes the subject matter of Example 125, and optionally, wherein the first non-legacy header comprises the first and second indications.

Example 128 includes the subject matter of any one of Examples 125-127, and optionally, wherein the first non-legacy header comprises a channel bitmap to indicate two or more channels to be bonded, when the second indication is to indicate channel bonding is to be used.

Example 129 includes the subject matter of Example 128, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 130 includes the subject matter of Example 129, and optionally, wherein two non-consecutive bits of the sequence of bits have a value to indicate that two non-contiguous channels are to be bonded.

Example 131 includes the subject matter of any one of Examples 125-127, and optionally, wherein the first non-legacy header comprises a first field to indicate a primary channel to be used for channel bonding, and a second field to indicate a channel bandwidth to be used for the channel bonding.

Example 132 includes the subject matter of any one of Examples 125-131, and optionally, wherein the radio is to process reception of at least the data portion of the frame over a bonded channel, when the second indication is to indicate channel bonding is to be used.

Example 133 includes the subject matter of any one of Examples 125-132, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 134 includes the subject matter of Example 133, and optionally, wherein the radio is to process reception of at least the data portion of the frame according to the one or more parameters.

Example 135 includes the subject matter of any one of Examples 125-134, and optionally, wherein the header portion is to comprise the second non-legacy header, the second non-legacy header comprising one or more Multi-User (MU) Multi-Input-Multi-Output (MIMO) (MU-MIMO) parameters.

Example 136 includes the subject matter of Example 135, and optionally, wherein the radio is to process reception of at least the data portion of the frame according to the MU-MIMO parameters.

Example 137 includes the subject matter of any one of Examples 125-136, and optionally, wherein the legacy header comprises a Single Carrier (SC) header.

Example 138 includes the subject matter of any one of Examples 125-137, and optionally, wherein the directional wireless communication band is a Directional Multi-Gigabit (DMG) band.

Example 139 includes the subject matter of any one of Examples 125-138, and optionally, wherein the first wireless station is a Directional Multi-Gigabit (DMG) Station (STA).

Example 140 includes an apparatus of wireless communication, the apparatus comprising means for processing at a first wireless station reception of a header portion of a frame from a second wireless station over a directional wireless communication band, the header portion comprising a legacy header, followed by a first non-legacy header, the header portion comprising a first indication to indicate whether or not the header portion is to comprise a second non-legacy header following the first non-legacy header, the header portion comprising a second indication to indicate whether or not channel bonding is to be used; and means for processing reception of at least a data portion of the frame based at least on the first non-legacy header.

Example 141 includes the subject matter of Example 140, and optionally, wherein the legacy header comprises the first and second indications.

Example 142 includes the subject matter of Example 140, and optionally, wherein the first non-legacy header comprises the first and second indications.

Example 143 includes the subject matter of any one of Examples 140-142, and optionally, wherein the first non-legacy header comprises a channel bitmap to indicate two or more channels to be bonded, when the second indication is to indicate channel bonding is to be used.

Example 144 includes the subject matter of Example 143, and optionally, wherein the channel bitmap comprises a sequence of a plurality of bits corresponding to a respective plurality of channels, a bit of the sequence of bits having a value to indicate whether or not a respective channel of the plurality of channels is to be bonded.

Example 145 includes the subject matter of Example 144, and optionally, wherein two non-consecutive bits of the sequence of bits have a value to indicate that two non-contiguous channels are to be bonded.

Example 146 includes the subject matter of any one of Examples 140-142, and optionally, wherein the first non-legacy header comprises a first field to indicate a primary channel to be used for channel bonding, and a second field to indicate a channel bandwidth to be used for the channel bonding.

Example 147 includes the subject matter of any one of Examples 140-146, and optionally, comprising means for processing reception of at least the data portion of the frame over a bonded channel, when the second indication is to indicate channel bonding is to be used.

Example 148 includes the subject matter of any one of Examples 140-147, and optionally, wherein the first non-legacy header comprises one or more parameters selected from the group consisting of a number of channels to be bonded, a modulation and coding scheme, a length of at least a data portion of the frame, a Cyclic Prefix (CP) interval, and a number of spatial streams.

Example 149 includes the subject matter of Example 148, and optionally, comprising means for processing reception of at least the data portion of the frame according to the one or more parameters.

Example 150 includes the subject matter of any one of Examples 140-149, and optionally, wherein the header portion is to comprise the second non-legacy header, the second non-legacy header comprising one or more Multi-User (MU) Multi-Input-Multi-Output (MIMO) (MU-MIMO) parameters.

Example 151 includes the subject matter of Example 150, and optionally, comprising means for processing reception of at least the data portion of the frame according to the MU-MIMO parameters.

Example 152 includes the subject matter of any one of Examples 140-151, and optionally, wherein the legacy header comprises a Single Carrier (SC) header.

Example 153 includes the subject matter of any one of Examples 140-152, and optionally, wherein the directional wireless communication band is a Directional Multi-Gigabit (DMG) band.

Example 154 includes the subject matter of any one of Examples 140-153, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station to:
    generate a Physical Layer Protocol Data Unit (PPDU) comprising a first header field and a second header (Header A) field after the first header field, the first header field comprising a length field to be decoded by Directional Multi Gigabit (DMG) stations, the Header A field comprising information for processing of the PPDU by a receiver of the PPDU, the Header A field comprising a first field having a value according to whether or not the PPDU is to include a third header (Header B) field comprising Multi User (MU) PPDU information after the Header A field, the Header A field comprising at least one second field to indicate a channel bandwidth comprising one channel or two or more channels; and
    transmit said PPDU over the channel bandwidth in a frequency band above 45 Gigahertz (GHz).

2. The apparatus of claim 1, wherein the first field of the Header A field comprises a first value when the PPDU is a Single-User (SU) PPDU without the Header B field, and wherein the first field of the Header A field comprises a second value when the PPDU is a MU PPDU comprising the Header B field.

3. The apparatus of claim 2, wherein the Header B field comprises Spatial Stream (SS) information corresponding to the MU PPDU.

4. The apparatus of claim 1, wherein the first field of the Header A field has a value of "1" when the PPDU is to include the Header B field.

5. The apparatus of claim 1, wherein the Header A field comprises a channel bitmap comprising a plurality of bits corresponding to a respective plurality of channels, a bit of the plurality of bits having a first value when a channel corresponding to the bit is to be used for the channel bandwidth, the bit having a second value when the channel corresponding to the bit is not to be used for the channel bandwidth.

6. The apparatus of claim 5, wherein the channel bitmap comprises 8 bits.

7. The apparatus of claim 1, wherein the Header A field comprises a primary channel field based on a channel number of a primary channel of a Basic Service Set (BSS).

8. The apparatus of claim 1, wherein the PPDU comprises a data field, and a Training (TRN) field after the data field.

9. The apparatus of claim 1, wherein the first header field comprises a Single Carrier (SC) field.

10. The apparatus of claim 1, wherein the first header field comprises at least one of a scrambler initialization field, or a Last Received Signal Strength Indication (RSSI) field.

11. The apparatus of claim 1, wherein the channel bandwidth comprises a plurality of contiguous channels.

12. The apparatus of claim 1, wherein the channel bandwidth comprises a plurality of non-contiguous channels.

13. The apparatus of claim 1, wherein the channel bandwidth comprises channel bonding of the two or more channels.

14. The apparatus of claim 1, wherein the channel bandwidth comprises a channel bandwidth of 4.32 GHz or 6.48 GHz.

15. The apparatus of claim 1, wherein the PPDU comprises an Extended Directional Multi-Gigabit (EDMG) PPDU, the Header A field comprises an EDMG Header A field, and the Header B field comprises an EDMG Header B field.

16. The apparatus of claim 1 comprising a Medium Access Control (MAC), and a Physical Layer (PHY).

17. The apparatus of claim 1 comprising a radio.

18. The apparatus of claim 1 comprising one or more antennas.

19. A product comprising one or more tangible computer-readable non-transitory storage media comprising computer-executable instructions operable to, when executed by at least one processor, enable the at least one processor to cause a wireless communication station to:
generate a Physical Layer Protocol Data Unit (PPDU) comprising a first header field and a second header (Header A) field after the first header field, the first header field comprising a length field to be decoded by Directional Multi Gigabit (DMG) stations, the Header A field comprising information for processing of the PPDU by a receiver of the PPDU, the Header A field comprising a first field having a value according to whether or not the PPDU is to include a third header (Header B) field comprising Multi User (MU) PPDU information after the Header A field, the Header A field comprising at least one second field to indicate a channel bandwidth comprising one channel or two or more channels; and
transmit said PPDU over the channel bandwidth in a frequency band above 45 Gigahertz (GHz).

20. The product of claim 19, wherein the first field of the Header A field comprises a first value when the PPDU is a Single-User (SU) PPDU without the Header B field, and wherein the first field of the Header A field comprises a second value when the PPDU is a MU PPDU comprising the Header B field.

21. The product of claim 20, wherein the Header B field comprises Spatial Stream (SS) information corresponding to the MU PPDU.

22. The product of claim 19, wherein the Header A field comprises a channel bitmap comprising a plurality of bits corresponding to a respective plurality of channels, a bit of the plurality of bits having a first value when a channel corresponding to the bit is to be used for the channel bandwidth, the bit having a second value when the channel corresponding to the bit is not to be used for the channel bandwidth.

23. The product of claim 19, wherein the Header A field comprises a primary channel field based on a channel number of a primary channel of a Basic Service Set (BSS).

24. The product of claim 19, wherein the PPDU comprises a data field, and a Training (TRN) field after the data field.

25. The product of claim 19, wherein the first header field comprises at least one of a scrambler initialization field, or a Last Received Signal Strength Indication (RSSI) field.

26. The product of claim 19, wherein the channel bandwidth comprises channel bonding of the two or more channels.

27. The product of claim 19, wherein the channel bandwidth comprises a channel bandwidth of 4.32 GHz or 6.48 GHz.

28. The product of claim 19, wherein the PPDU comprises an Extended Directional Multi-Gigabit (EDMG) PPDU, the Header A field comprises an EDMG Header A field, and the Header B field comprises an EDMG Header B field.

29. An apparatus comprising logic and circuitry configured to cause a wireless communication station to:
receive a first header field and a second header (Header A) field of a Physical Layer Protocol Data Unit (PPDU), the Header A field is after the first header field, the first header field comprising a length field to be decoded by Directional Multi Gigabit (DMG) stations, the Header A field comprising information for processing of the PPDU by a receiver of the PPDU, the Header A field comprising a first field having a value according to whether or not the PPDU is to include a third header (Header B) field comprising Multi User (MU) PPDU information after the Header A field, the Header A field comprising at least one second field to indicate a channel bandwidth comprising one channel or two or more channels; and
based at least on the Header A field, process at least a data field of said PPDU over the channel bandwidth in a frequency band above 45 Gigahertz (GHz).

30. The apparatus of claim 29, wherein the first field of the Header A field comprises a first value when the PPDU is a Single-User (SU) PPDU without the Header B field, and wherein the first field of the Header A field comprises a second value when the PPDU is a MU PPDU comprising the Header B field.

31. The apparatus of claim 30, wherein the Header B field comprises Spatial Stream (SS) information corresponding to the MU PPDU.

32. The apparatus of claim 29, wherein the first field of the Header A field has a value of "1" when the PPDU is to include the Header B field.

33. The apparatus of claim 29, wherein the Header A field comprises a channel bitmap comprising a plurality of bits corresponding to a respective plurality of channels, a bit of the plurality of bits having a first value when a channel corresponding to the bit is to be used for the channel bandwidth, the bit having a second value when the channel corresponding to the bit is not to be used for the channel bandwidth.

34. The apparatus of claim 33, wherein the channel bitmap comprises 8 bits.

35. The apparatus of claim 29, wherein the Header A field comprises a primary channel field based on a channel number of a primary channel of a Basic Service Set (BSS).

36. The apparatus of claim 29, wherein the PPDU comprises a Training (TRN) field after the data field.

37. The apparatus of claim 29, wherein the first header field comprises a Single Carrier (SC) field.

38. The apparatus of claim 29, wherein the first header field comprises at least one of a scrambler initialization field or a Last Received Signal Strength Indication (RSSI) field.

39. The apparatus of claim 29, wherein the channel bandwidth comprises a plurality of contiguous channels.

40. The apparatus of claim 29, wherein the channel bandwidth comprises a plurality of non-contiguous channels.

41. The apparatus of claim 29, wherein the channel bandwidth comprises channel bonding of the two or more channels.

42. The apparatus of claim 29, wherein the channel bandwidth comprises a channel bandwidth of 4.32 GHz or 6.48 GHz.

43. The apparatus of claim 29, wherein the PPDU comprises an Extended Directional Multi-Gigabit (EDMG) PPDU, the Header A field comprises an EDMG Header A field, and the Header B field comprises an EDMG Header B field.

44. The apparatus of claim 29 comprising a Medium Access Control (MAC), and a Physical Layer (PHY).

45. The apparatus of claim 29 comprising a radio.

46. The apparatus of claim 29 comprising one or more antennas.

47. A product comprising one or more tangible computer-readable non-transitory storage media comprising computer-executable instructions operable to, when executed by at least one processor, enable the at least one processor to cause a wireless communication station to:
receive a first header field and a second header (Header A) field of a Physical Layer Protocol Data Unit (PPDU), the Header A field is after the first header field, the first header field comprising a length field to be decoded by Directional Multi Gigabit (DMG) stations, the Header A field comprising information for processing of the PPDU by a receiver of the PPDU, the Header A field comprising a first field having a value according to whether or not the PPDU is to include a third header (Header B) field comprising Multi User (MU) PPDU information after the Header A field, the Header A field comprising at least one second field to indicate a channel bandwidth comprising one channel or two or more channels; and
based at least on the Header A field, process at least a data field of said PPDU over the channel bandwidth in a frequency band above 45 Gigahertz (GHz).

48. The product of claim 47, wherein the first field of the Header A field comprises a first value when the PPDU is a Single-User (SU) PPDU without the Header B field, and wherein the first field of the Header A field comprises a second value when the PPDU is a MU PPDU comprising the Header B field.

49. The product of claim 48, wherein the Header B field comprises Spatial Stream (SS) information corresponding to the MU PPDU.

50. The product of claim 47, wherein the Header A field comprises a channel bitmap comprising a plurality of bits corresponding to a respective plurality of channels, a bit of the plurality of bits having a first value when a channel corresponding to the bit is to be used for the channel bandwidth, the bit having a second value when the channel corresponding to the bit is not to be used for the channel bandwidth.

51. The product of claim 47, wherein the Header A field comprises a primary channel field based on a channel number of a primary channel of a Basic Service Set (BSS).

52. The product of claim 47, wherein the PPDU comprises a Training (TRN) field after the data field.

53. The product of claim 47, wherein the first header field comprises at least one of a scrambler initialization field or a Last Received Signal Strength Indication (RSSI) field.

54. The product of claim 47, wherein the channel bandwidth comprises channel bonding of the two or more channels.

55. The product of claim 47, wherein the channel bandwidth comprises a channel bandwidth of 4.32 GHz or 6.48 GHz.

* * * * *